United States Patent
Broutier et al.

(10) Patent No.: US 6,309,746 B1
(45) Date of Patent: Oct. 30, 2001

(54) HALOGEN-FREE FIRE-RETARDING COMPOSITION, YARN FIRE-RETARDED WITH THE LATTER AND FIRE-RESISTANT TEXTILE STRUCTURE COMPRISING SUCH YARNS

(75) Inventors: Isabelle Broutier, Saint Romain de Jalionas; Francois-Xavier Damour, Lyon, both of (FR)

(73) Assignee: Chavanoz Industrie, Chavanoz (FR)

(*) Notice: Subject to any disclaimer, the term of this patent is extended or adjusted under 35 U.S.C. 154(b) by 0 days.

(21) Appl. No.: 09/284,804
(22) PCT Filed: Nov. 17, 1997
(86) PCT No.: PCT/IB97/01443
  § 371 Date: Jun. 1, 1999
  § 102(e) Date: Jun. 1, 1999
(87) PCT Pub. No.: WO98/22555
  PCT Pub. Date: May 28, 1998

(30) Foreign Application Priority Data

Nov. 19, 1996 (FR) .................................................. 96 14418

(51) Int. Cl.$^7$ ........................................................ D02G 3/00
(52) U.S. Cl. .......................... 428/375; 428/370; 428/390; 428/423.1; 428/921
(58) Field of Search ..................................... 524/100, 416, 524/415; 252/609, 601; 528/259; 428/375, 365, 370, 382, 390, 423.1, 920, 921

(56) References Cited

U.S. PATENT DOCUMENTS

| 3,892,667 | * | 7/1975 | Touval ................................. 252/8.1 |
| 4,256,786 | | 3/1981 | Dias et al. . |
| 4,265,963 | | 5/1981 | Matalon . |
| 5,185,103 | | 2/1993 | Eswarakrishnan et al. . |
| 5,344,855 | * | 9/1994 | Narita et al. ......................... 523/179 |
| 5,723,515 | * | 3/1998 | Gottfried .............................. 523/179 |
| 5,788,915 | * | 8/1998 | Blount .................................. 252/609 |
| 5,854,309 | * | 12/1998 | Blount .................................. 523/179 |

* cited by examiner

Primary Examiner—Merrick Dixon
(74) Attorney, Agent, or Firm—Oliff & Berridge, PLC

(57) ABSTRACT

A halogen-free fire retarding plastic coating composition, includes a binding fraction that has a limited oxygen index (LOI) of at least 25% and an intumescent agent that has a thermodegradable strong acid compound and a polyhydric carbon compound, with a weight ratio of the strong acid compound to the polyhydric compound of between 1.5 and 2.

19 Claims, No Drawings

HALOGEN-FREE FIRE-RETARDING COMPOSITION, YARN FIRE-RETARDED WITH THE LATTER AND FIRE-RESISTANT TEXTILE STRUCTURE COMPRISING SUCH YARNS

The present invention relates to a fire-retarding composition, comprising an intumescent agent, intended to be applied to a substrate, for example to yarns or textile structures, so as to render them more fire-resistant. The present invention will be more particularly described in relation to the fire-retarding of yarns and textile structures, and the non-inflammability requirements of such yarns and textile structures.

It is already known, for example from U.S. Pat. No. 3,934,066, to apply, for example by impregnation, an intumescent agent to a porous support and to incorporate or apply the said fire-retarded support to combustible substrates so as to render them non-inflammable. The intumescent agent comprises water-soluble or water-dispersible components, especially a thermodegradable strong-acid compound, for example phosphoric acid, and a polyhydric carbon compound, for example pentaerythritol.

Quite a detailed description of the operation and of the composition of such systems is given in the article in the French journal entitled "Plastiques Modernes, Dossiers Additifs [*Modern Plastics, Additives Section*], August 1994" and the article published in "Flame Retardants '94". However, and as emphasized in this document, the actual application of these agents, compared with the wide choice possible, has hitherto been very limited.

In general, such intumescent agents are also known in combination with plastics. For example, U.S. Pat. No. 4,256,786 describes a fire-retarding composition for the impregnation of a plastic-based foam, or its combination with a textile layer, especially a polyurethane foam with a cotton fabric. The compositions are obtained by preparing an aqueous paste containing activated charcoal, an ammonium polyphosphate, a pentaerythritol and a binder, which may be an acrylic resin. Such resins are used as a minor part of the fire-retarding composition, other components being incorporated (for example activated carbon, esterified copolymer of maleic anhydride and of styrene, CMC), which may increase the non-inflammability of the fire-retarding composition. Moreover, the compositions described in that document cannot be used for fire-retarding products which will be exposed to the weather, since they exhibit moisture-uptake problems.

Moreover, U.S. Pat. No. 5,185,103 describes an intumescent composition for fire-retarding electrical cables, comprising an organic polymer, ammonium polyphosphate (APP) and an (alkyl carbonate) polyol. The organic polymer is insoluble in water and is generally thermoplastic, for example polyethylene, polypropylene, EVA and polyesterurethanes. The composition is obtained by simply mixing the various components at a sufficient temperature for the organic polymer to be in the liquid state (generally between 125°–300° C. [sic], preferably between 150°–200° C. [sic]). However, these compositions have all proved to be lacking in terms of non-inflammability.

In the description and claims, and in accordance with the definitions given in the above articles, the terms and expressions indicated below have the following meanings:

"a thermodegradable strong-acid compound" is a compound which releases a strong acid, either by itself or in situ from a precursor, at high temperature, i.e. between approximately 100° C. and approximately 250° C.;

"a polyhydric carbon compound" is a compound generally chosen from the various classes of carbohydrates, and which has a relatively high amount of carbon and many hydroxyl sites;

"a blowing or expansion agent" is an agent separate from the strong-acid compound and the polyhydric carbon compound, which releases non-inflammable gases, such as $CO_2$ and $NH_3$, during its thermal degradation and which contribute [sic] to the intumescent effect by forming an expanded carbon structure; these compounds are generally amines and amides.

The technical problem that the Applicant set out to solve is to obtain a fire-retarding composition comprising a binding fraction and an intumescent agent, while keeping or improving the properties of the intumescent agent without correspondingly impairing the basic properties of the binding fraction, for example its thermal-bonding behavior and/or its resistance to water uptake, which would allow it to be applied to substrates, such as specialty yarns or textile structures, especially specialty fabrics, for example in the form of blinds, and to obtain improved fire resistance in these products.

The Applicant has therefore studied such compositions and has discovered that the solution to the problem posed above resides in the need to start with a binding fraction which itself has minimal non-inflammability, in combination with a certain weight ratio of the thermodegradable strong-acid compound to the polyhydric carbon compound, thereby making it possible to provide flexibility with regard to the amount and the composition of the intumescent agent to be used.

Consequently, one subject of the present invention relates to a halogen-free fire-retarding plastic composition, which can be applied to a substrate, comprising a binding fraction, which binds the said composition, and an intumescent agent consisting of a thermodegradable strong-acid compound and a polyhydric carbon compound. The composition is more particularly characterized in that the binding fraction as such has a limited oxygen index (LOI) of at least 25% and the intumescent agent essentially consists of the said strong-acid compound and the said polyhydric carbon compound, the solids content of the composition having a weight ratio of the said strong-acid compound to the said polyhydric carbon compound of between 1.5 and 2, and preferably 1.85.

In fact, the Applicant has discovered that this ratio in combination with the limited oxygen index of the binding fraction was important for ensuring that a finished product is obtained, for example a fire-retarded yarn and textile fabric, having the necessary characteristics for manufacturing blinds for example. In particular, it has been discovered that, if the ratio goes below the value of 1.5, the products fire-retarded with this composition had too high a water uptake and were difficult to process. Moreover, it has been discovered that if the ratio exceeds the value of 2, difficulties are encountered in coating the composition, for example on yarns, and the intumescence becomes very insufficient.

The present invention therefore makes it possible to dispense with any other fire-retarding agent, especially a toxic fire-retarding agent, such as melamine.

Another subject of the present invention is a fire-resistant composite yarn comprising a core made of a halogen-free material and a sheath made of a plastic, the composition of the said plastic being identical to the fire-retarding composition according to the definition given above. This fire-resistant composite yarn may be preferably obtained by coating the core with such a fire-retarding composition. The core may be of diverse nature, for example a yarn made of an inorganic or organic material, of natural or synthetic origin, such as glass, polyester, polyamide, polypropylene or polyethylene, and contain no halogen or halogen compound.

In a preferred embodiment of this subject, the fire-resistant yarn has a limited oxygen index, measured according to the NF G 07128 standard, of between approximately 40% and approximately 50%, preferably of 45%, and an intumescent expansion factor of between approximately 30% and approximately 60%, preferably of 50%.

A third subject of the present invention is a textile structure, consisting of an assembly or entanglement of the fire-resistant yarns defined above.

A fourth subject of the present invention is a fire-retarded composite textile structure, comprising a halogen-free fibrous support and at least one layer or film coating the fibrous support, the said layer or the said film being identical to the fire-retarding composition defined above. Textile structures of this type may be, for example, specialty fabrics, nonwoven structures and knitted structures, these serving, for example, for manufacturing blinds, curtains and the like.

The fire-retarding composition according to the present invention may be in any suitable form whether this be in the form of a solid mixture or in the form of a melt or liquid. However, and advantageously, the fire-retarding composition is in the form of an aqueous dispersion.

According to a preferred embodiment of the invention, the binding fraction consists of a polymer having, as such, a limited oxygen index (LOI) of at least 25%.

According to another preferred embodiment of the invention, the binding fraction comprises a polymer having, as such, a limited oxygen index (LOI) of less than 25% and a fire retardant, for example an inorganic substance containing phosphorus. Such a compound is available commercially, for example from the company THOR. This fire retardant may also be an alumina hydroxide or an organophosphorus compound. However, it should be noted that this fire retardant is always different and separate from the components making up the intumescent agent, and especially from the thermodegradable strong-acid compound.

The polymer of the binding fraction is not limited to one polymer in particular, as long as it fulfills the function of binder for the fire-retarding composition. Advantageously, the polymer binder is a polyurethane or an acrylic polymer, in which case the binding fraction includes a fire retardant.

Preferably, the thermodegradable strong-acid compound is chosen from the group consisting of phosphoric acids and boric acids, or a salt of these acids having a volatile cation, and preferably ammonium polyphosphate. In fact, the acid-supplying agent is chosen to be able to dehydrate the carbon-supplying agent in an effective manner, above a certain temperature or in the presence of a flame, and to release the acid below the decomposition temperature of the carbon-supplying agent. Salts of these acids with a volatile cation are often used since they allow the acid to be released in temperature ranges close to the ignition temperature of the substrate to be fire-retarded.

The polyhydric carbon compound is preferably a starch or a polyhydric alcohol, and more preferably pentaerythritol. In fact, these agents contain a relatively high amount of carbon and many hydroxyl sites, this being conducive to the formation of a large quantity of expanded residue.

According to a preferred embodiment of the present invention, the intumescent agent contains virtually no blowing or expansion agents, other than the strong-acid compound and/or the polyhydric carbon compound. In fact, this is not necessary for the formation of an expanded carbon structure since the reaction alone, of the thermodegradable strong-acid compound with the polyhydric carbon compound, can release enough gas to expand the char residue.

Preferably, the solids content of the fire-retarding composition may consist, by weight:
of 30% to 50% of polyurethane;
of 20% to 40% of ammonium polyphosphate;
of 10% to 30% of pentaerythritol.

More preferably, the solids content of the above composition consists, by weight, of 42.85% of polyurethane, of 37.15% of ammonium polyphosphate and of 20% of pentaerythritol.

According to another preferred embodiment of the invention, the solids content of the fire-retarding composition may consist, by weight:
of 35% to 45% of acrylic polymer;
of 15% to 35% of ammonium polyphosphate;
of 10% to 15% of pentaerythritol;
of 10% to 30% of fire retardant.

In this case, the solids content of the composition more particularly consists, by dry weight:
of 42.11% of acrylic polymer;
of 25.30% of ammonium polyphosphate;
of 13.64% of pentaerythritol;
of 18.95% of fire retardant.

The following examples allow the advantages of the fire-retarding composition according to the invention to be more clearly understood, by showing the LOI values measured according to French Standard NF G 07 128, the expansion factor and the moisture uptake that the Applicant has obtained for the formulations claimed.

The limited oxygen index (LOI) value was obtained using the method defined in the NF G 07 128 standard, the moisture uptake is that obtained on a yarn in a wet medium after 4 h at 100% humidity and at 20° C., and the expansion factor corresponds to the expansion percentage obtained after triggering the intumescent system.

Table 1 below gives two examples of a fire-retarding composition according to the present invention, with a binding fraction based on a mixture of aqueous dispersions of crosslinkable pure acrylic resins, sold under the name PLEXTOL® DV440 and PLEXTOL® NV604 by the company ROHM. The percentages of components given are percentages by weight of the solids content.

TABLE 1

|  | Example 1 | Example 2 |
|---|---|---|
| Acrylics (binder) | 40.15 | 53.1 |
| Additives | 1.8 | 1.98 |
| Ammonium polyphosphate | 24.06 | 16.4 |
| Pentaerythritol | 16.06 | 8.85 |
| Fire retardant | 17.93 | 19.67 |
| LOI, Acrylics | 22.3% | 22.3% |
| LOI, Acrylics + Fire retardant | 26.3 | 26.3 |
| LOI on films made in the laboratory | 34% | 44.00% |
| Expansion factor on coated yarn | 65.90% | 43.50% |
| Water uptake | 1 h = 2.76% | 1 h = 2.23% |

In experiments carried out with a weight ratio of the said strong-acid compound to the said polyhydric carbon compound of 4, it has been discovered that the expansion factor was only 10%, this being greatly insufficient for manufacturing specialty fabrics, such as blinds.

What is claimed is:

1. A halogen-free fire retarding plastic coating composition, comprising a binding fraction that has a limited oxygen index (LOI) of at least 25%, and an intumescing agent consisting essentially of a thermodegradable strong acid compound and a polyhydric carbon compound, with the exclusion of alkyl carbonate polyols, with a weight ratio of the strong acid compound to the polyhydric compound of between 1.5 and 2.

2. The composition of claim 1, wherein the intumescent agent is made of said strong acid compound and said polyhydric carbon compound.

3. The composition of claim 1, wherein the intumescent agent does not contain a blowing agent or an expansion agent.

4. The composition of claim 1, wherein the binding fraction consists of a polymer having a limited oxygen index (LOI) of at least 25%.

5. The composition of claim 1, wherein the binding fraction comprises a polymer having a limited oxygen index (LOI) of less than 25% and a fire retardant comprising 0% of the strong acid compound.

6. The composition of claim 5, wherein the fire retardant is an inorganic phosphorus compound.

7. The composition of claim 5, wherein the binding fraction further comprises a polyurethane or an acrylic polymer.

8. The composition of claim 1, wherein the composition is in a form of an aqueous dispersion.

9. The composition of claim 1, wherein the thermodegradable strong acid compound is selected from the group consisting of phosphoric acids, boric acids, and a salt of a boric acid having a volatile cation.

10. The composition of claim 9, wherein the thermodegradable strong acid compound is ammonium polyphosphate.

11. The composition of claim 1, wherein the polyhydric carbon compound is a starch or a polyhydric alcohol.

12. The composition of claim 1, wherein a solid content consists, by weight, of: 30% to 50% polyurethane; 20% to 40% ammonium polyphosphate; and 10% to 30% pentaerythritol.

13. The composition of claim 12, wherein the solid content consists, by weight, of: 42.85% polyurethane; 37.15% ammonium polyphosphate; and 20% pentaerythritol.

14. The composition of claim 1, wherein a solid content consists, by weight, of: 35% to 45% acrylic polymer; 15% to 35% ammonium polyphosphate; 10% to 15% pentaerythritol; and 10% to 30% fire retardant.

15. The composition of claim 14, wherein the solid content consists, by weight, of: 42.11% acrylic polymer; 25.30% ammonium phosphate; 13.64% pentaerythritol; and 18.95% fire retardant.

16. A Fire-resistant composite yarn comprising a core made of a halogen-free material and a sheath made of the plastic composition of claim 1.

17. The fire-resistant composite yarn according to claim 16, wherein the yarn has a limited oxygen index (LOI), measured according to the NF G 07128 standard, of between 40% and 50%, and an intumescent expansion factor of between 30% and 60%.

18. A textile structure, consisting of an assembly or entanglement of yarns according to claim 16.

19. A fire-retarded composite textile structure, comprising a halogen-free fibrous support and at least one layer or film coating the fibrous support, wherein the layer or film is made of a plastic composition according to claim 1.

* * * * *